United States Patent [19]

Prater et al.

[11] Patent Number: 4,609,185
[45] Date of Patent: Sep. 2, 1986

[54] FENCE STRUCTURE AND METHOD FOR INSTALLATION

[75] Inventors: Ernest W. Prater, Irving; Sidney M. Henry, Jr., Dallas, both of Tex.

[73] Assignee: Southwest Metals, Inc., Carrollton, Tex.

[21] Appl. No.: 623,953

[22] Filed: Jun. 25, 1984

[51] Int. Cl.[4] ............................................ E04H 17/14
[52] U.S. Cl. ....................... 256/65; 256/22; 256/70; 403/255
[58] Field of Search ........................ 211/41; 248/297.2; 52/528; 403/255, 187, 252, 295, 230; 256/21, 22, 65, 66, 70, 59

[56] References Cited

U.S. PATENT DOCUMENTS

| | | | |
|---|---|---|---|
| 2,762,398 | 9/1956 | Adam | 52/710 |
| 3,822,053 | 7/1974 | Daily. | |
| 3,902,703 | 9/1975 | Bouye. | |
| 3,921,960 | 11/1975 | Bright. | |
| 3,955,801 | 5/1976 | Soriero, Jr.. | |
| 4,007,919 | 2/1977 | Totten. | |
| 4,035,097 | 7/1977 | Bachand | 403/353 |
| 4,140,298 | 2/1979 | Coleman, Jr.. | |
| 4,144,689 | 3/1979 | Bains. | |
| 4,149,701 | 4/1979 | Densen. | |
| 4,188,019 | 2/1980 | Meredith. | |
| 4,279,529 | 7/1981 | Lande et al.. | |
| 4,464,074 | 8/1984 | Green et al. | 403/192 |

FOREIGN PATENT DOCUMENTS 52-49640 4/1977 Japan.

Primary Examiner—Cornelius J. Husar
Assistant Examiner—Joseph A. Fischetti
Attorney, Agent, or Firm—Richards, Harris, Medlock & Andrews

[57] ABSTRACT

A rail and post fence structure (20) includes tubular posts (22) having a plurality of apertures (50) in the side walls thereof for receiving one end of the rails (24, 26, 28, 30). Each rail has a generally channel cross-section with a web (56) and side walls (58) extending therefrom. The side walls have flanges (60) extending inwardly. The aperture in the side walls of the posts substantially correspond with the outer configuration of the rails such that assembly is accomplished by inserting the rails into the apertures of the posts. The rails are attached to the posts by use of a separator structure for spreading the side walls of the rails. This separator structure includes an elongated clip (70) having a web (72) and a pair of legs (74, 76) extending from opposing longitudinal sides of the web for engagement with the inturned flanges of the rail. The dimension of the clip is such that by aligning the clip by rotation between the inturned flanges of the rail, the side walls of the rail are forced outwardly for engagement against the post at the point of insertion of the rail.

11 Claims, 6 Drawing Figures

FENCE STRUCTURE AND METHOD FOR INSTALLATION

TECHNICAL FIELD

The present invention relates to a fence structure, and more particularly to a post and rail fence assembly including a structure and method for rigid, releasable attachment of the rails to the posts.

BACKGROUND ART

Many fence designs have been used in the past for defining property boundaries, as protective devices to prevent entry and as a means of confining animals. These structures have included wood, metal, plastic and wire or cable fences. Prior fence structures have presented problems with respect to installation, strength and cost of the fencing material and repair. A number of fence designs have included the use of metal post and rail components in an effort to resolve problems as to these features. However, many arrangements for attachment of the rails to the posts have not provided a system which is both low cost and sufficiently rigid upon installation to withstand the normal, and on occasion extraordinary, use to which fencing is subjected in a agricultural, commercial and residential environment.

Examples of post and rail structures which have been used in the past include D. E. Daily, U.S. Pat. No. 3,822,053; J. Bouye, U.S. Pat. No. 3,902,703; R. W. Bright, U.S. Pat. No. 3,921,960; W. A. Soriero, Jr., U.S. Pat. No. 3,955,801; C. D. Totten, U.S. Pat. No. 4,007,919; J. D. Coleman, Jr., U.S. Pat. No. 4,140,298; K. T. Densen, U.S. Pat. No. 4,149,702 and Japanese Patent No. 52-49640. Although these patents describe various post and rail fence assemblies, the structures fail to provide a straightforward and rigid means of construction of the posts and rails and means for attachment of the rails to the posts. Further, these systems generally are complex in their structure, providing difficult structures for assembly and in many cases semi-permanent attachment which makes repair of fence structure or adjustment difficult, or impossible, without damage to the fence structure. In other of these designs, where a semi-permanent attachment is not provided, the attachment is not sufficient to withstand the use and wear encountered by fences used in a agricultural, commerical or residential applications.

Thus, a need has arisen for a fence structure which is rigid in its structure, provides for ease of assembly and repair, is aesthetically pleasing and economical to manufacture.

DISCLOSURE OF THE INVENTION

The present invention relates to a post and rail fence structure comprising a tubular post for being mounted in a substantially vertical position at spaced intervals with a plurality of sheet formed rails adapted to extend horizontally between the posts. The posts have a plurality of apertures in the side wall thereof for receiving one end of a rail. Each rail has a generally channel cross-section with a web and side walls extending therefrom. The side walls have flanges extending inwardly. In a primary embodiment of the invention, the post and rails are roll formed structures made of 18 gauge galvanized steel or equivalent.

The apertures in the side walls of the tubular post substantially correspond with the outer configuration of the rails such that assembly is accomplished by inserting the rails into the apertures of the post. The rails are attached to the post by use of a separator structure for spreading the side walls of the rails after insertion therein. This separator structure includes an elongated clip having a web and a pair of legs, extending from opposing longitudinal sides of the web, for engagement with the inturned flanges of the rail. The dimension of the clip is such that by inserting the clip between the inturned flanges of the rail, the side walls of the rail are forced outwardly for engagement against the post at the point of insertion of the rail.

In a further embodiment of the invention, the clip includes an elongated slot in each of the clip legs extending inwardly from the ends thereof. These notches are arranged for receiving the inturned flanges of the rail. In one embodiment, one of the slots is longer than the other slots, being formed further inwardly from the edge of the clip, to facilitate installation.

In still a further embodiment of the invention, one notch has a side opposite that of the web which tapers from the end of the clip toward the web to facilitate installation.

The clip web has a tool receiving aperture by which the clip may be rotated into place between the inturned flanges of the rail to spread the side walls and fixedly attach the rails to the posts.

BRIEF DESCRIPTION OF THE DRAWINGS

For a more complete understanding of the present invention, and for further detail and advantages thereof, reference is now made to the following Detailed Description taken in conjunction with the accompanying drawings, in which.

DETAILED DESCRIPTION

Figure 1:
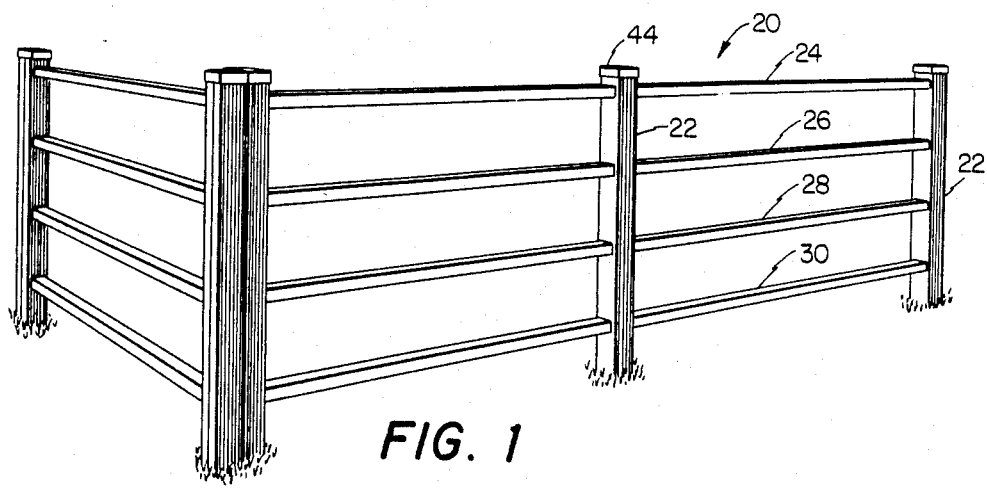
FIG. 1 is a perspective view of a post and rail fence employing the present invention.
Figure 4:
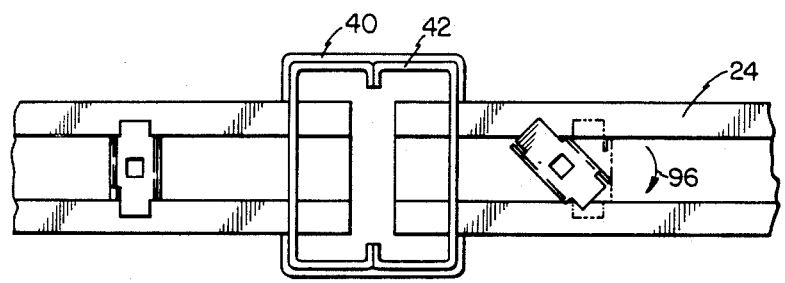
FIG. 4 is a section view taken through one post of the fence structure looking upwardly from below the fence rails showing the attachment of the rails to the post.

The present invention is directed to a fence structure and particularly to a fence structure using vertical posts and a plurality of horizontal rails extending from and attached between the posts. Referring to FIG. 1, a fence structure 20, incorporating the present invention, is shown including a plurality of posts 22 mounted in a substantially vertical position at spaced locations. A plurality of horizontal rails 24, 26, 28 and 30 are attached at varying elevations between post 22. In the primary embodiment of the invention, posts 22 are of a tubular design, as shown in FIG. 4. The post shown in the primary embodiment are of a sheet formed construction and particularly may be made using two channel sections 40 and 42 which are attached to form a tubular post as shown. The illustrations also show post 22 as including a cap 44 positioned on the upper end thereof. In one embodiment of the invention, 18 gauge galvanized steel is used to form both the post and rails. However, it will be appreciated that other material, such as roll formed, bent, extruded or cast, may be used in forming the post and rails without departing from scope of the present invention.

Figure 2:
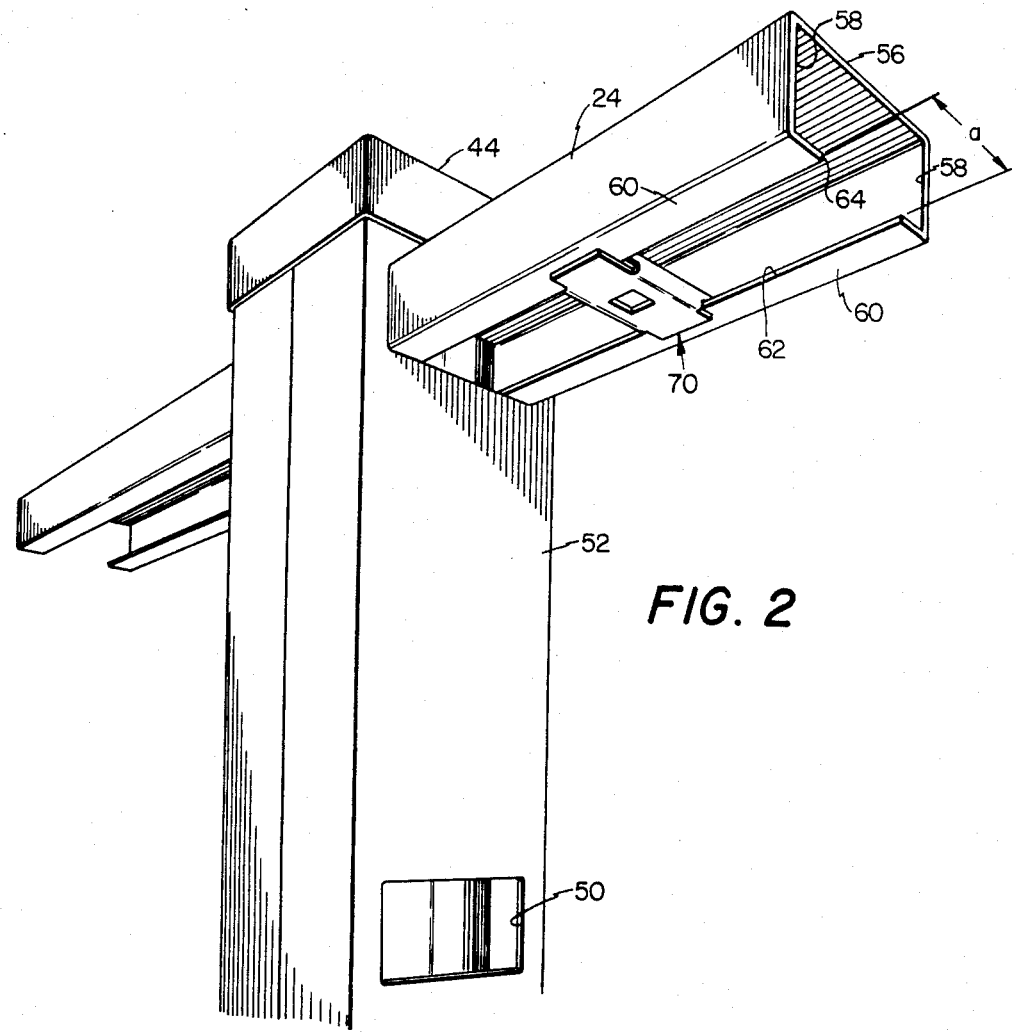
FIG. 2 is a perspective view showing the clip used in attaching the rails and posts in the fence structure.

Posts 22 have a plurality of apertures 50 formed in the side wall 52 at varying vertical elevations corresponding to the desired vertical position for rails 24, 26, 28 and 30. FIG. 2 shows upper rail 24, which is representative of the construction of rails 26, 28 and 30. Rail 24 has a channel cross-section including a web 56, side walls 58 extending substantially perpendicularly from web 56 and flanges 60 extending inwardly from the ends of side walls 58 remote from web 56. Edges 62 and 64 of flanges 60 confront one another and define a gap a therebetween.

Figure 3:
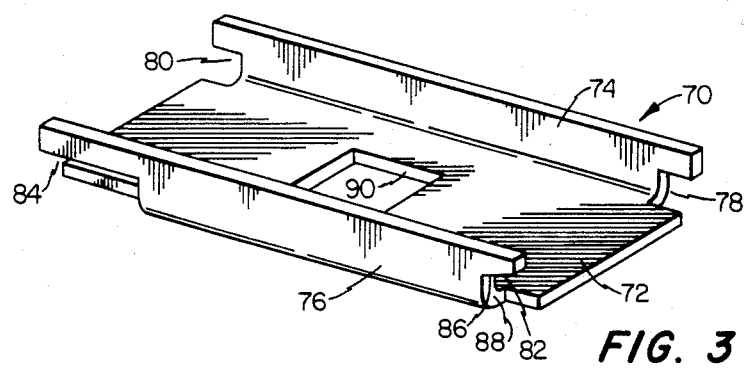
FIG. 3 is a perspective view of the clip used in assembly of the fence structure.

FIGS. 2 and 3 illustrate a clip 70 for use in attaching the rails to the post. Referring specifically to FIG. 3, clip 70 includes a web 72, and upstanding legs 74 and 76. Leg 74 has material removed therefrom to define slots 78 and 80 between the leg and web 72. As can be seen in FIG. 3, slots 78 and 80 are subtantially rectangular in shape.

Leg 76 has material removed therefrom to define slots 82 and 84 between the leg and web 72. Slot 82 has a tapered wall 86 converging inwardly from the end of leg 76 toward web 72. The base of the slot is defined by a wall 88 substantially perpendicular to web 72. Slot 84 is substantially rectangular but extends further inwardly from the end of clip 70 than do slots 78 and 80.

A tool engaging aperture 90 is formed in web 72 and may be of any shape to cooperate with a tool for rotating the clip during installation as will be described hereinafter in greater detail. In one embodiment, aperture 90 may be sized to receive a standard socket wrench driver.

Figure 5:
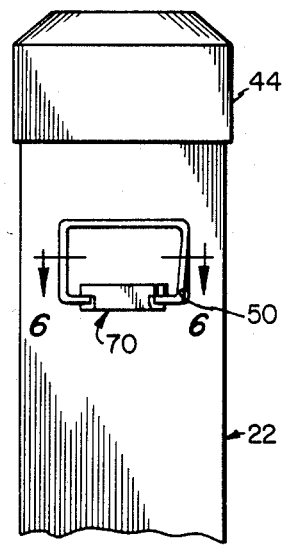
FIG. 5 is a side view looking along one of the rails of the fence structure.
Figure 6:
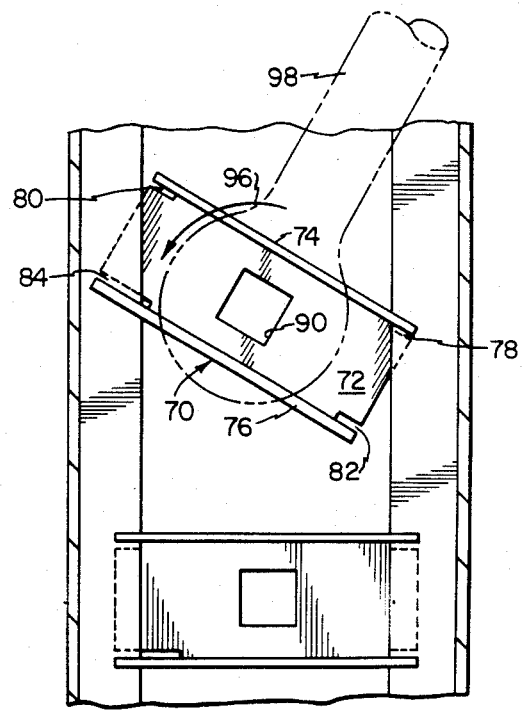
FIG. 6 is a section view taken along line 6—6 of FIG. 5.

As can be seen in FIGS. 2 and 5, the cross-section of rail 24 substantially conforms to aperture 50 in post side wall 52. A clearance on the order of 0.010 inch may be provided in width and height to permit easy insertion of the rail into the post apertures. The dimension of aperture 50 may, of course, be varying with the objective being to provide a snug fit for the rails upon insertion into post 22 while permitting ease of insertion of the rail. Attachment of the rails to the post is then accomplished by use of clip 70. With the rail positioned within aperture 50 of post 22, as shown in FIG. 4, clip 70 is engaged between inturned flanges 60. The initial positioning of clip 70 is as shown in solid lines in the right portion of FIG. 4 with the inturned flanges 60 engaged within slots 78, 80 and 84. As can be seen in FIGS. 4 and 6, the use of longer slot 84 permits the clip 70 to be positioned at a skewed angle relative to the longitudinal axis of the rail. This can be easily done such that web 72 is positioned exteriorly of inturned flanges 60 and the portion of legs 74 and 76 defining slots 78, 80 and 84 positioned on the opposite side of inturned flanges 60 of rail 24.

In assembly, clip 70 is rotated in the direction shown by arrow 96 of FIGS. 4 and 6 using an appropriate wrench 98 such that its longitudinal axis is aligned perpendicular to that of the rail. As has been mentioned hereinabove, wrench 98 may be a standard socket wrench driver having a driving shaft for engaging aperture 90. Upon rotation of clip 70, the full length of leg 74 of clip 70, defined between slot 78 and 80, is positioned between confronting faces 62 and 64 of flanges 60. As a result, flanges 60 are separated and rail side walls 58 are moved outwardly for engagement against the edges of the aperture 50 defined in post 22. Also upon rotation, flange 60 registers in slot 82 such that the clip is then securely positioned with web 72 exteriorly of flanges 60 and the portion of legs 74 and 76 defining slots 78, 80, 82 and 84 positioned interiorly of flanges 60. The tapered wall 86 defining slot 82 facilitates the engagement of flange 60 into slot 82. Further, the tapered wall 86, upon full registration of flange 60 within slot 82, provides for close engagment of flange 60 between web 72 and tapered wall 86 adjacent vertical face 88. Upon rotation of clip 70, into position with its longitudinal axis substantially perpendicular to the longitudinal axis of the rail, the clip may be lightly tapped to move it relative to post 22 to exert a desired outward expanding force on the side walls of rail 24 as required to provide for rigid attachment of the rail to the post.

Assembly of the fence is then accomplished using the present invention by first positioning posts in a vertical or other desired position in the ground surface at spaced location as desired. The posts are installed at spaced points slightly less than the overall length of rails 24, 26, 28 and 30. In one embodiment, posts are positioned 8 feet apart on center, and rails having a length of 7 feet, 11 inches are used. Rails are then positioned between the posts by first inserting one end of the rail in an aperture of post 22 and moving it to or beyond the center line of the post to permit the insertion of the opposite end of the rail into the adjacent post. Then the rail is moved laterally to center the rail between the post such that the rail is positioned with both ends in adjacent posts.

As can be appreciated, the dimensions of the posts are such that this assembly is easily permitted. Further, the dimension of rail needed within the post structure is only minimal given the means of attachment of the rails to the post.

Then, clips 70 are inserted between the inturned flanges of the rail as described above and rotated into place to spread the side walls of the rail thereby providing a rigid engagement of the rails to the post.

As can be appreciated from the description of the present invention and the method for assembly, the present invention provides a post and rail structure which may be easily assembled and yet rigidly secured to withstand the use encountered in agricultural, commercial or residential use. Further, the present invention provides a system which permits removal of the rail without damage to any of the components and with great ease. Thus, removal for repair of any component may be easily made in the present invention while at the same time the invention provides a structure which has great stability and ridigity upon completion of installation.

Further, the present invention defines a post and rail assembly which lends itself to the manufacture of components using formed steel, or comparable material for the post and rails. Although the present invention is not limited to roll formed components, the manufacture and finishing of these components provide for ease of manufacture and high durability and strength.

Atlhough preferred embodiments of the invention have been described in the foregoing detailed description and illustrated in the accompanying drawings, it will be understood that the invention is not limited to the embodiments disclosed, or the specific method of manufacture disclosed, but is capable of numerous rearrangements, modifications and substitutions of parts and elements without departing from the spirit of the invention. Accordingly, the present invention is intended to encompass such rearrangements, modifications and substitutions as fall within the spirit and scope of the invention.

We claim:

1. a rail and post fence structure comprising:
   a post having an aperture therein for receiving one end of one said rail, said rail being tubular and having a longitudinal cutout in the wall thereof along a distance adjacent to the end thereof, said cutout defining confronting edges,
   separator means for spreading the side walls of said rail into interference contact with said post by the insertion thereof in the aperture in said post, said separator means comprising a clip with a web and a pair of legs extending downwardly therefrom from opposing sides, said legs having slots extending inwardly from the opposite edges thereof for receiving the contronting edges of the rail to force the side walls of the rail in contact with the aperture in said post, said post aperture, said rail and longitudinal cutout, and said clip and legs thereof being dimensioned to provide an interference engagement between said rail and post aperture.

2. The structure according to claim 1 wherein one said slot extends further inwardly from the edge of said clip than said remaining slots.

3. The structure according to claim 1 wherein one of the slots has a side opposite said web converging from the end of the clip inwardly toward the web.

4. The structure according to claim 1 wherein the web of said clip has a tool receiving aperture by which said clip may be rotated into place between the confronting edges of the rail to spread the side walls and thereby engage the rail to the post.

5. In a post and rail fence structure wherein said post has apertures for receiving the ends of rails therein and said rails have a generally channel section with a web, side walls extending therefrom with inturned flanges extending from the ends of the side walls remote from the web and defining confronting edges, a clip for spreading said side walls upon installation of the rails to the post comprising:
   a web,
   a pair of legs extending downwardly from opposing sides of said web with slots in each leg extending longitudinally inwardly from the opposite edges of the clip for receiving the confronting edges of the inturned flanges of the rail such that the edges of the rail engage the slots of at least one of said legs, one said slot extending farther inwardly from the edge of said clip than the remaining slots.

6. The structure according to claim 5 wherein one of the slots has a side opposite said web converging from the end of the clip inwardly toward the web.

7. The structure according to claim 5 wherein the web of said clip has a tool receiving aperture by which said clip may be rotated into place between the confronting edges of the rail to spread the side walls and thereby attach the rail to the post.

8. A post and rail fence structrue comprising:
   a tubular post from being mounted in a substantially upright position,
   a rail extending from said post, the post having an aperture in the side wall thereof for receiving one end of said rail,
   said rail having generally a channel cross-section with a web and side walls extending therefrom, said side walls having inturned flanges extending therefrom defining confronting edges,
   separator means for spreading the side walls of said rails after the insertion of said rails into said post to provide an interference fit between said rail side walls and the aperture in said post, said separator means comprising a clip with a web and a pair of legs extending downwardly therefrom from opposing sides of said web, said legs having slots extending inwardly from the opposite edges thereof for receiving said confronting edges of said inturned flanges to spread the side walls of the rail for engagement with said post, said post aperture, said rail and inturned flanges, and said clip and legs thereof being dimensioned to provide an interference fit between said rail side walls and the aperture in said post.

9. The structure according to claim 8 wherein one said slot extends further inwardly from the edge of said clip than said remaining slots.

10. The structure according to claim 8 wherein one of the slots has a side opposite said web converging from the end of the clip inwardly toward the web.

11. The structure according to claim 8 wherein the web of said clip has a tool receiving aperture by which said clip may be rotated into place between the inwardly extending flanges of the rail to spread the side walls and thereby attach the rail to the post.

* * * * *